July 12, 1966   E. D. SHIPLEY ET AL   3,260,844
CALUTRON WITH MEANS FOR REDUCING LOW FREQUENCY
RADIO FREQUENCY SIGNALS IN AN ION BEAM
Filed Jan. 31, 1964    6 Sheets-Sheet 1
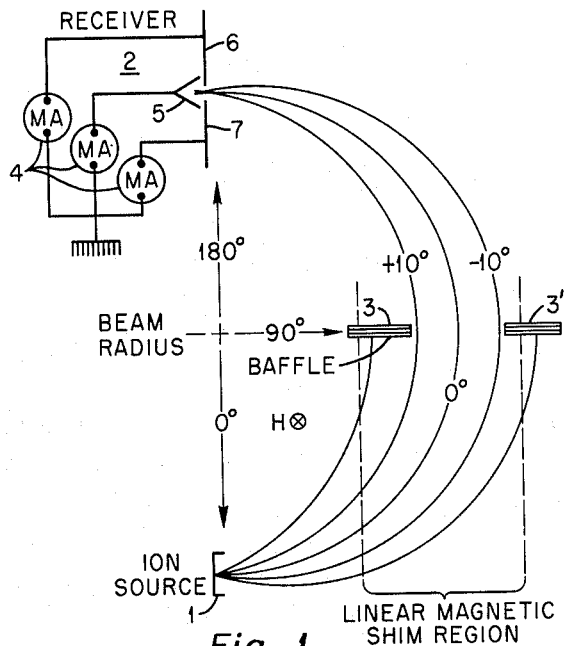
PRIOR ART *Fig. 1.*
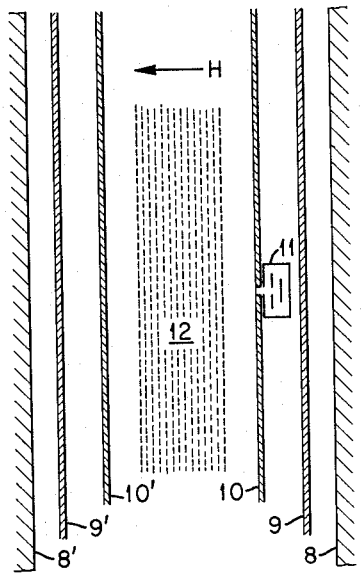
*Fig. 2.* PRIOR ART
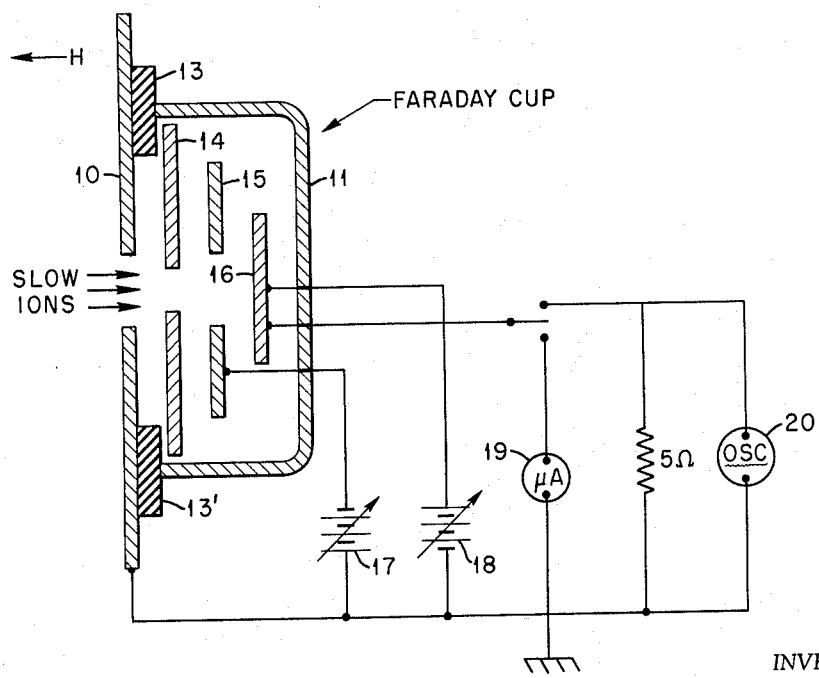
PRIOR ART *Fig. 3.*
INVENTORS.
Elwood D. Shipley
Allen M. Veach
Oliver C. Yonts
BY
ATTORNEY.

July 12, 1966  E. D. SHIPLEY ETAL  3,260,844
CALUTRON WITH MEANS FOR REDUCING LOW FREQUENCY
RADIO FREQUENCY SIGNALS IN AN ION BEAM
Filed Jan. 31, 1964  6 Sheets-Sheet 3
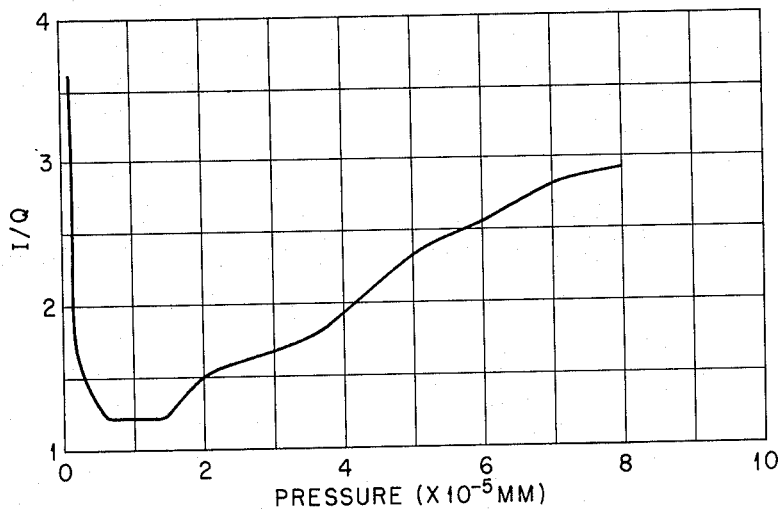
PRIOR ART *Fig. 6.*
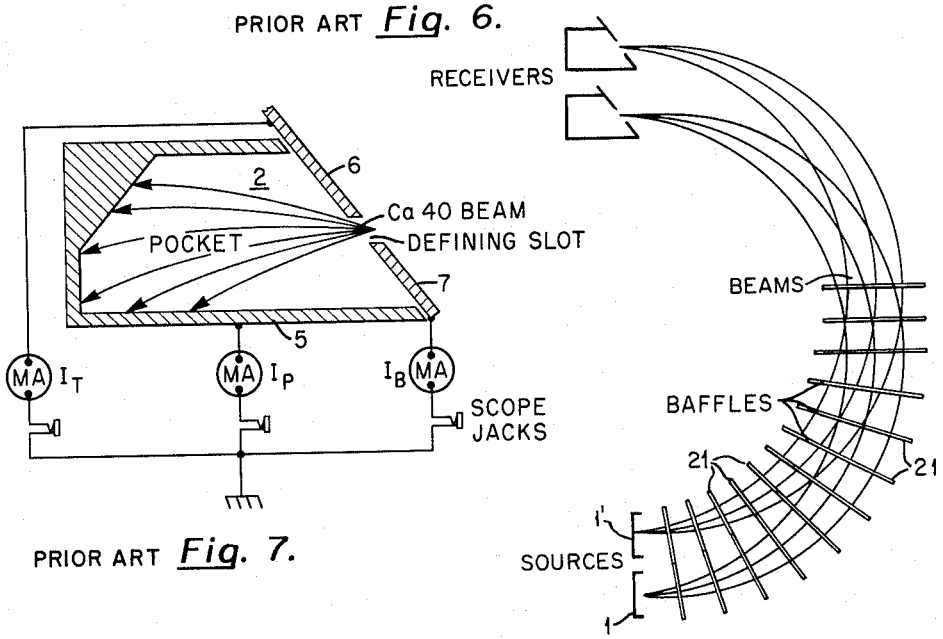
PRIOR ART *Fig. 7.*
*Fig. 8.*
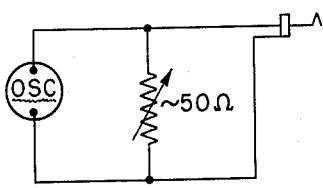
*Fig. 7A* PRIOR ART
INVENTORS.
Elwood D. Shipley
Allen M. Veach
BY  Oliver C. Yonts
ATTORNEY.

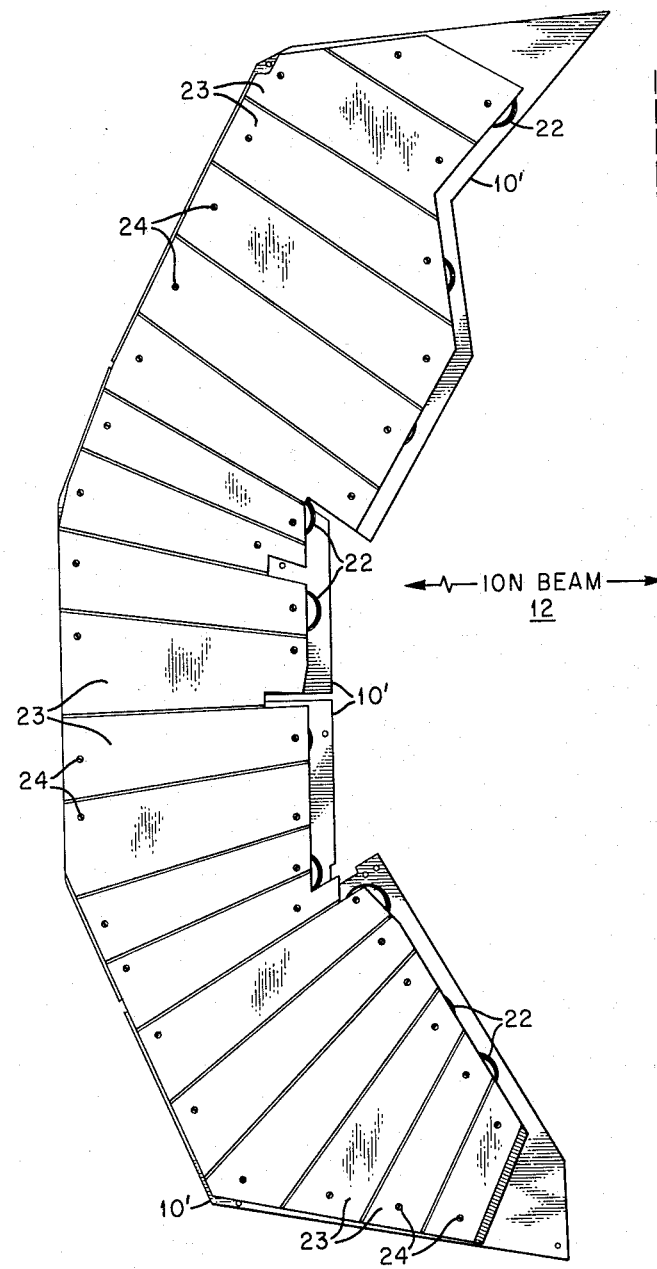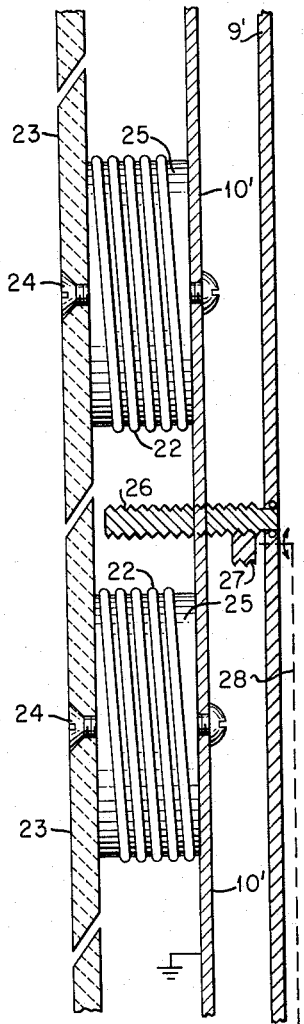
Fig. 10.
Fig. 9.
INVENTORS.
Elwood D. Shipley
Allen M. Veach
Oliver C. Yonts
ATTORNEY.

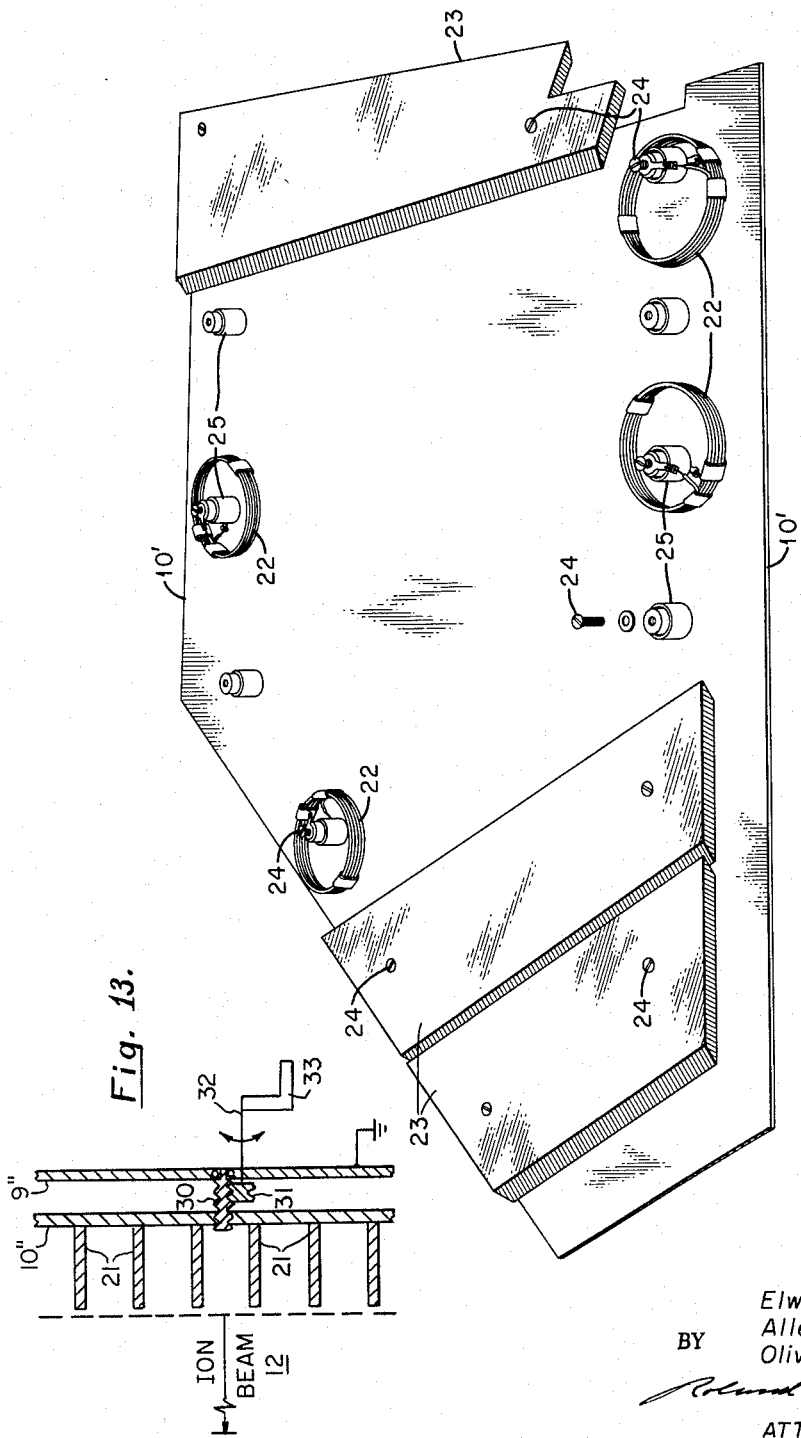

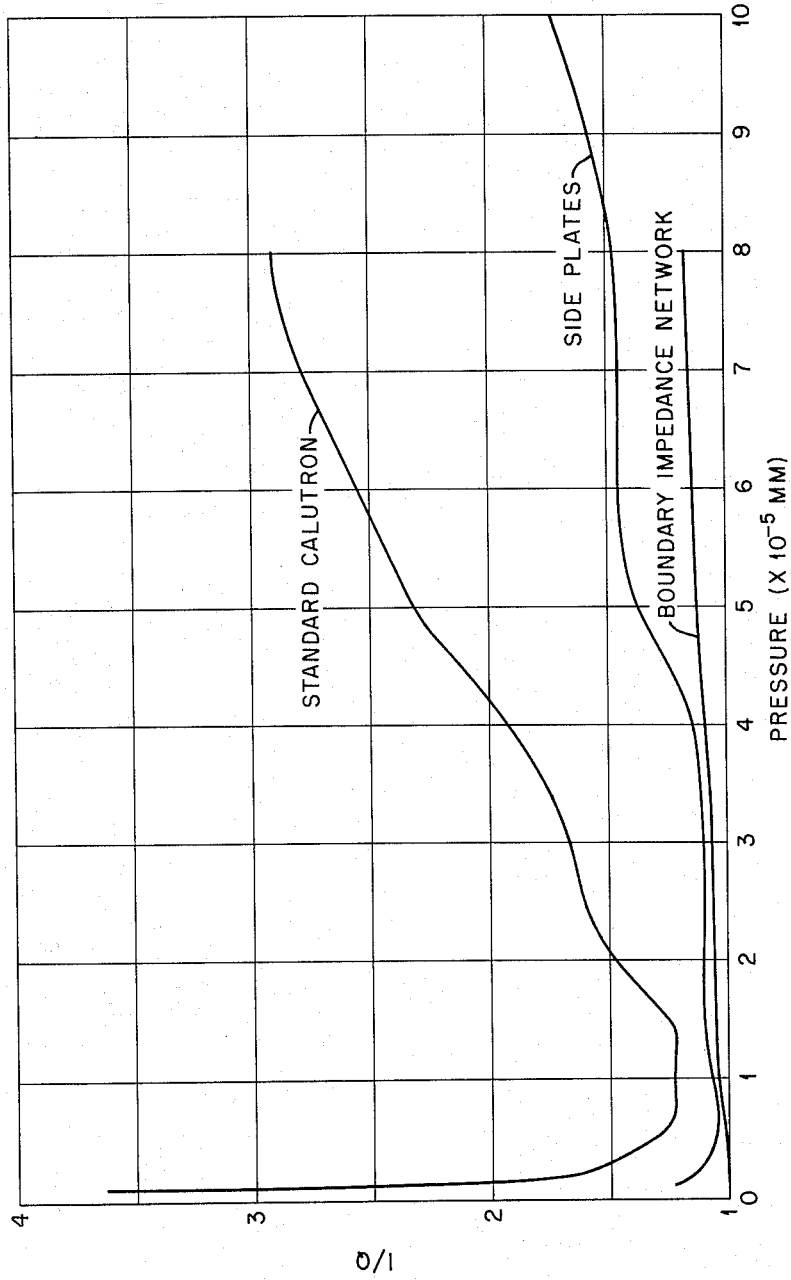

# United States Patent Office 3,260,844
Patented July 12, 1966

3,260,844
CALUTRON WITH MEANS FOR REDUCING LOW FREQUENCY RADIO FREQUENCY SIGNALS IN AN ION BEAM
Elwood D. Shipley, Knoxville, and Oliver C. Yonts and Allen M. Veach, Oak Ridge, Tenn., assignors to the United States of America as represented by the United States Atomic Energy Commission
Filed Jan. 31, 1964, Ser. No. 341,816
5 Claims. (Cl. 250—41.9)

This invention relates to an improved operation of an electromagnetic mass spectrometer which includes means for substantially reducing the ion beam oscillations within the spectrometer which are caused by interaction of the ion beam with its environment.

It has been shown that isotopes of many chemical elements can be separated and the desired elements enriched in the electromagnetic mass spectrometer known as the calutron, described in the E. O. Lawrence patent, No. 2,709,-222. In the calutron, as described in that patent, there is provided an ion-producing means wherein a feed or charge material is converted into ions for subsequent acceleration through a magnetic field and separation into the respective masses of the isotopes present in the charge material. Since most charge materials are solids, the charge must first be heated in a vaporizer or oven to produce a charge vapor. Vapor from the vaporizer or oven passes to an arc chamber where a stream of electrons (commonly called the arc discharge) is passed through these vapors, ionizing them. Ions from the arc chamber pass through an exit slit and are accelerated through the magnetic field of the calutron to a collection receiver.

In prior art calutrons such as the one described in the above-mentioned patent, there exist certain instabilities that adversely affect the focus and beam quality of the ion beam such that the ion beam could only be efficiently operated within a narrow pressure range and the output density of such a beam was materially limited. The above instabilities which caused ion beam defocusing and beam fluctuation can be attributed to low frequency radio frequency signals which are caused by the interactions between the ion beam and the plasma with its sheath which encompasses the ion beam with their environment. These low frequency RF signals are all such signals below about 1 mc.

The above low frequency RF signals in a conventional calutron adversely affect the focus of the divergent ion beam above and below a very narrow operating pressure range and thus the calutron could not be efficiently operated outside this very narrow pressure range.

With a knowledge of the limitations of prior calutrons, as discussed above, it is a primary object of this invention to provide an improved calutron with means to substantially eliminate the adverse effects caused by beam-plasma interactions within the calutron.

It is another object of this invention to provide an improved calutron including means for not only suppressing low frequency RF signals, but also substantially improving beam quality and for efficient operation of the calutron over a large operating pressure range without beam defocusing.

These and other objects and advantages of the present invention will become apparent upon a consideration of the following detailed specification and the accompanying drawings, wherein:

FIG. 1 is a schematic diagram of the beam configuration produced in a conventional calutron-type device;

FIG. 2 is a sectional view of a calutron at the 90° position showing the use of side plates and a Faraday cup for measuring slow ion drain;

FIG. 3 is a schematic view of a Faraday cup with its measuring circuitry;

FIG. 6 is a beam quality curve for a standard calutron;

FIG. 7 is a schematic showing of an ion collection and measuring device for use with a calutron;

FIG. 7a is a schematic showing of a scope input system for the device of FIG. 7;

FIG. 8 is a schematic showing of the use of a plurality of baffles in a calutron for improving beam focus and minimizing unwanted low frequency RF signals;

FIG. 9 is a partial cross-sectional view of the use of a plurality of "Boundary Impedance Network" units for suppressing unwanted low frequency RF signals in a calutron;

FIG. 10 is a plan view of the assembled units of FIG. 9 as used in a calutron;

FIG. 11 is a partial view of FIG. 10 with some of the plates of the units removed;

FIG. 12 is a series of beam quality curves for a standard calutron, a calutron with side plates, and a calutron with "Boundary Impedance Network" units such as shown in FIG. 10; and FIG. 13 is a partial cross-sectional view of the plurality of baffles of FIG. 8 and their mounting arrangement, and including means for adjusting the position of the baffles with respect to the calutron ion beam.

Figure 4:
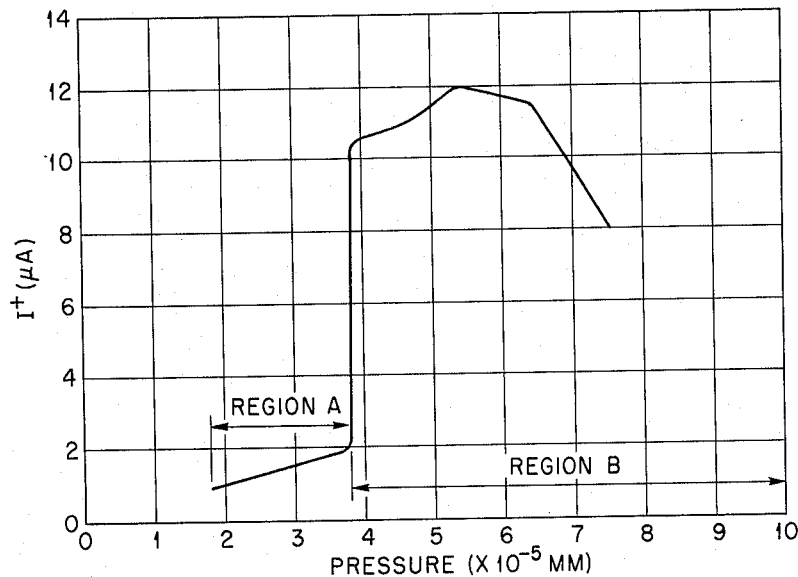
FIG. 4 is a typical slow ion drain curve for a standard calutron.

The above objects have been accomplished in the present invention by the use of a plurality of baffles to minimize the unwanted low frequency RF signals, discussed above, or by the use of a series of plates each connected to a grounded coil. The complete latter system is bounded on each side of the ion beam from source to receiver, with each individual plate or segment extending through 10° of beam trajectory. The junction between adpacent segments is formed so that no part of the beam plasma can reach the calutron wall directly. Instead, current from the beam region can reach ground only by passing through a coil connecting each plate to the liner. The use of segmented sidewalls is the preferred form of the present invention for the reasons to be discussed below.

In reference to the drawings, FIG. 1 shows a typical beam configuration produced in a conventional calutron-type device. Ions are formed in an electron-impact source 1, as in the above-mentioned patent, and accelerated by a suitable source across a magnetic field as shown in FIG. 1. Ions are received in a receiver 2 provided with a collector 5, a top plate 6 and a bottom plate 7 defining a slot of a selected opening. Milliammeters 4 may be used for measuring the current received by collector 5 and plates 6, 7. In some calutrons, magnetic shims are used to improve the beam focus. The units 3, 3' in FIG. 1 provide a baffle for improved separation of the desired isotope.

In a conventional calutron, the ion beam is bounded by grounded tank-liner surfaces spaced 12 inches apart, for example, in FIG. 2 these surfaces are shown as 9, 9'. The magnetic field H is provided by pole pieces 8, 8'. In certain past applications, side plates, such as 10, 10' in FIG. 2, are used within the liner to reduce the distance between the beam and the walls of the calutron. These side plates also provided a support for Faraday cups used for determining the slow ion drain characteristics of the ion beam and plasma, such as 12 in FIG. 2. Only one Faraday cup 11 is shown in FIG. 2. The use of side plates in prior calutrons improved the focal quality of low intensity ion beams. However, the use of these side plates does not completely eliminate radio frequency disturbances from the ion beam and thus the beam quality of such beams is not as good as desired.

The details of the Faraday cup 11 of FIG. 2 are shown in FIG. 3. The Faraday cup 11 is spaced from the side plate 10 by a pair of spacers 13, 13'. The plate 14 provides a defining slit 1 mm. by 50 mm. A grid 15 with a slit 3 mm. by 55 mm. is disposed between plate 14 and a collector plate 16. The plate 16 is connected by way of a selector switch to a microammeter 19 or to a frequency spectrum analyzer scope 20. The microammeter 19 is used for measuring the ion current striking the plate 16 and the scope 20 is used for observing the frequency spectrum of the ion current. A negative potential of 150–200 volts is applied to the grid 15 by means of a battery 17 so that only positive ions are received at the collector plate 16 of the Faraday cup 11.

In a typical operation of a conventional calutron, the slow ions produced thereby have been measured by a Faraday cup as described above and located adjacent to the primary beam at the 90° position. An argon beam was used and the pressure varied between the limits of $10^{-5}$ to $10^{-4}$ mm. Hg. The slow positive ions received by the cup are produced by ionization and charge exchange collisions between the primary beam ions and the background gas. Since the cross sections for those processes are known, one should be able to calculate the current to the cup and would expect it to vary linearly with pressure. Such a linear response was observed within the pressure range of $10^{-5}$ to about $4 \times 10^{-5}$ mm. Hg; however, in the pressure region above $4 \times 10^{-5}$ mm. Hg, an abrupt rise in secondary ion formation was observed. The rate of increase or "take-off" is sufficiently pronounced which suggests the presence of a secondary ionization process. A typical slow ion drain curve for a conventional calutron is plotted in FIG. 4, as measured by a Faraday cup in the manner indicated above. The pressure range below which take-off occurs, generally $<10^{-5}$ to about $4 \times 10^{-5}$ mm. Hg, is designated as region "A," and that range above which take-off is observed, $>4 \times 10^{-5}$ mm. Hg, is designated as region "B." The curve in region A extrapolates to zero and is in agreement with published charge exchange and cross section data. At the beginning of region B, the curve breaks abruptly and rises to 5–10 times the normal expected value. The presence of the secondary ionization process in the pressure region B can be attributed to the above-described low frequency RF signals, as more fully set forth below.

Figure 5:
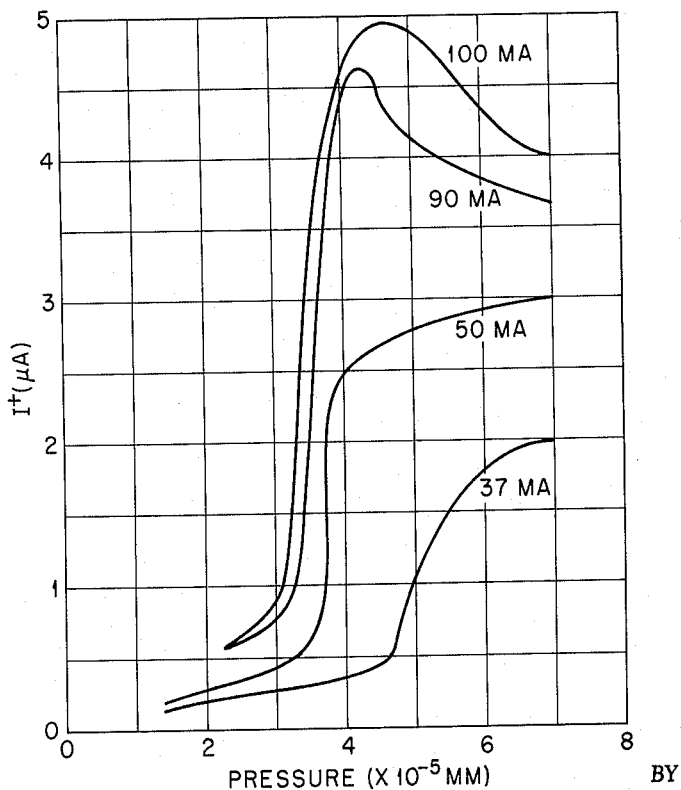
FIG. 5 is a family of slow ion drain curves for a plurality of primary beam currents in a standard calutron.

Further, measurements with the conventional calutron have shown a definite relationship between primary ion density and the characteristic shape of the drain-pressure relationship. FIG. 5 shows a family of curves taken over a wide pressure range at predetermined values of primary ion current. It should be noted that the slope of the linear portion of the curves increases with an increase in primary ion current, and that the breakpoint occurs at a lower pressure when the primary current is increased. As might be expected, the extent of take-off is less pronounced at low values of primary current. An anomalous fall-off in slow ion current appears at higher values of primary current and background pressure. This set of data supports the concept that the linear portion of each curve results from the formation of secondary ions by primary ion collision events. It shows also that the secondary events begin to take place at a lower pressure when the number of primary ions is increased. The extent of this secondary action is increased in the presence of an increase in primary ion population.

The receiver 2 of FIG. 1 is shown in more detail in FIG. 7. The currents to pocket 5, top plate 6, and bottom plate 7 are measured by milliammeters 4. FIG. 7a shows a scope input system for use with FIG. 7. The "quality" of a mono-isotopic ion beam may be defined as pocket current divided by the current received at the pocket plus that received by the top and bottom plates; that is $Q = I_P/(I_P + I_T + I_B)$. To establish a reference for measurement, the reciprocal of beam quality (degree of blow-up) is plotted as a function of pressure in FIG. 6 for calcium separation in a standard calutron unit. Low pressure blow-up is exhibited by the steep rise at the extreme left of the figure. The best operating condition is associated with the flat portion of the curve, that is, about $1 \times 10^{-5}$ mm. Hg, and high pressure blow-up is evidenced by the rise in the right hand portion of the curve. Thus, it can be seen from FIG. 6 that optimum beam quality in a standard calutron occurs for a small range of operating pressure.

The beam plasma in a conventional calutron operating in pressure region A of FIG. 4 has present in it broad bands of RF oscillations extending from about 100 kc. to 17 mc. The primary ion beam, when observed at the collector 5 of FIG. 7 with the scope of FIG. 7a, has present in it bands of low frequency RF oscillations starting at 100 kc. and extending to about 1 mc. Peaks of varying intensity are usually observed near 200 kc., 400 kc., and 800 kc. Generally the amplitudes of the 200–400 kc. oscillations are the largest of any of those observed.

When plasma oscillations are observed with the scope 20 connected to the plate 16 of the Faraday cup of FIG. 3, bands of frequencies are found to extend to about 25 mc. The plasma oscillations below 1 mc. exhibit the same bands of frequencies and relative amplitudes as do the oscillations observed in the primary ion beam. Other bands of frequencies are centered around 5, 13, 16 and 23 mc.

Operation of the conventional calutron in pressure region B of FIG. 4 is accompanied by a rise in radio frequency background until a general continuum of oscillations extends from about 100 kc. to 25 mc. The bands of oscillations originally observable in region A are superimposed on the continuum and exhibit an increase in amplitude. Certain bands of oscillations have been observed to shift in frequency components as background pressure is increased. The band centered around 13.5 mc. at $1.7 \times 10^{-5}$ mm. Hg shifts to 16 mc. at $2.8 \times 10^{-5}$ mm. Hg, to 20 mc. at $3.7 \times 10^{-5}$ mm. Hg, and to $>25$ mc. at still higher pressures. This frequency shift can be roughly correlated with the energy of electrons oscillating through the positive potential well of the beam.

In the conventional calutron, any change in primary ion density or in background pressure creates a variation in the character of the secondary plasma associated with the ion beam and also the slow ion drain characteristic of the calutron as set forth above in connection with FIG. 5. In an effort to determine if the abnormal drain and oscillatory nature of the secondary plasma noted in pressure region B of FIG. 4 can interact with the primary beam and adversely affect its focal quality, observations were made by passing a primary beam of calcium ions through a background gas of argon. It was determined from these observations that focus acceptable for isotope separation was maintained at pressures corresponding to the upper portion of region A. When the background pressure was raised into region B, $>4 \times 10^{-5}$ mm. Hg, an abrupt defocusing of the primary beam reaching the receiver was noted. It should also be noted that this abrupt change in beam quality coincides with the abrupt "take-off" in secondary ion population in the plasma.

A more detailed analysis of beam focal quality was made by use of an oscilloscope connected to the pocket 5 of the receiver of FIG. 7. A low intensity variation of 200 to 400 kc. was observed during operations in pressure region A. The observed pattern represents an intensity modulation of 3 to 8 percent of the total received beam. However, abrupt changes occur as the pressure reaches region B, and the amplitude of the 200 to 400 kc. signal increases by a factor of 3 to 5. A superimposed general noise signal also appears. In addition to the above observations, when pressures are reduced below that of normal operation in the conventional calutron, i.e., from $1 \times 10^{-5}$ to $>5 \times 10^{-6}$ mm. Hg, a substantial broadening of the beam pattern is observed on the collector. When monitored with an oscilloscope, it is found that the ion beam is sweeping across the collector at about a 200 kc. rate and with an amplitude of 2½ inches on either side of the collector pocket. Thus, in a conventional calutron, the beam "blow-up" and its associated beam defocusing at both high and low pressures has been shown to involve radio-frequency disturbances.

Having determined that low frequency RF oscillations in the ion beam of a conventional calutron adversely affect the focus of the beam due to beam blow-up at high and low operating pressures and thus resulting in poor beam quality at these pressures, led to the suggestion that if these oscillations in the ion beam could be negated, the beam blow-up and associated defocusing might be substantially eliminated. The present invention relates to the use of various means in a calutron in which the low frequency RF oscillations in the ion beam are substantially negated, thus resulting in an ion beam in which beam blow-up is substantially reduced, and a beam which is well focused with a marked improvement in beam quality.

FIG. 8 shows the use of a plurality of baffles as one means in which the objectionable effects of radio-frequency oscillations in a calutron have been essentially overcome for operation at background pressures higher than region A of FIG. 4. A plurality of baffles 21 are installed on each side of the primary beam. Each of the baffles consisted of a graphite plate extending perpendicularly to the beam from solid support plates, not shown. The positions of the plates are adjustable such that the baffles extend so that they approximately intercept the edge of the beam at its greatest anticipated throughput. The baffles 21 are disposed between the ion source 1 and the 90° beam position. FIG. 13 shows one means for mounting the baffles and including means for adjusting the position of the baffles with respect to the ion beam. The baffles 21 in FIG. 13 are mounted on a graphite plate 10″. The plate 10″ and the baffles 21 mounted thereon are movable as a unit by means of a screw thread member 30 which is freely rotatable in the calutron enclosure wall 9″ by means of a ball bearing coupling as shown, with the member 30 threadedly engaging the plate 10″. Rotation of the member 30 is effected by means of a worm screw member 31 engaging the member 30, with rotation of member 31 being effected by means of a shaft 32 and a hand crank 33. Thus, rotation of member 30 by the elements 31, 32 and 33 can position the plate 10″ and the attached baffles 21 any desired distance from the edge of the ion beam 12. Only one position adjusting means is shown in FIG. 13, however, it should be understood that a plurality of such means can be used, if desired, with the respective worm gears associated therewith coupled to a common control means. In addition, any other suitable position control means can be used, if desired, in place of the above means.

The device of FIG. 8 shows the use of the baffles with a two-arc calutron unit. It should be understood that the device of FIG. 8 can be used and has been used efficiently with a single arc unit as set forth below. In addition, the two-arc calutron unit can be used with segmented plate device of FIGS. 9, 10, and 11, to be described below, and the advantages of such use are also described hereinafter.

It has been determined that the use of these baffles is effective in reducing the oscillations when the calutron single arc is operating in the pressure range from $.5 \times 10^{-5}$ mm. Hg to $10^{-4}$ mm. Hg. For example, at normal operating conditions using about a 90 ma. Ca ion beam, with argon support, the RF signal in the range of 0-3 mc. was about eight times greater without baffles than when the baffles were used. However, when attempts were made to operate the calutron with the baffles at pressures lower than $.5 \times 10^{-5}$ mm. Hg, the operation was unsatisfactory because beam blow-up and defocusing still occurred and there was only a very minor improvement in operation at these lower pressures. Operation at these lower pressures is more desirable than at higher pressures since there is less background gas available at lower pressures for reacting with the ions of the primary ion beam, with the result that a greater density ion beam is produced for more efficient isotope separation.

Since the use of baffles limited the use of the modified calutron to operation at pressures higher than about $.5 \times 10^{-5}$ mm. Hg, a different and preferred means will now be described which has been found to be effective in substantially eliminating the objectionable oscillations in a calutron, and resulted in a well focused ion beam with no beam blow-up at all available operating pressures. Such a means is shown in FIGS. 9, 10, and 11. In this system, the walls on either side of the beam are composed of a series of plates each connected to a grounded coil. The complete system bounds each side of the beam from source to receiver, with each individual plate or segment extending through 10° of the beam trajectory. The junction between adjacent segments is formed so that no part of the beam plasma can reach the calutron liner wall directly. Instead, current from the beam region can reach ground only by passing through a multi-turn coil connecting each plate to the liner.

An edge view of the plates and coils is shown in FIG. 9. Mounted to the plate 10′, which in turn is fastened to the calutron liner wall, are a plurality of cylindrical insulators 25. Attached to the opposite ends of the insulators are conductive plates 23. These plates 23 may be mounted so as to be parallel to the plate 10′ and the liner wall with overlapping chamferred edges, as shown, or may be slightly inclined thereto so that one plate will overlap the edge of, but not contact, the adjacent plate. Encircling each of the insulators is a conductive coil 22, one coil for each plate, having one end electrically connected to the plate 10′, and the second end electrically connected to a plate 23 as with a plate mounting screw 24. The coils 22 do not necessarily have to be wound on the insulators as shown, but may be formed coils of insulated wire as shown in FIG. 11. Each plate 23 with its coil 22 may be referred to as a "Boundary Impedance" unit, and all of the units as a "Boundary Impedance Network," or as a "BIN."

The assembly of the elements 10′, 22, 23, 24 and 25 may be moved as a unit to vary the distance between the faces of the plates 23 and the edge ion beam 12 in the following manner. The above assembly may be moved as a unit by means of a screw thread member 26 threadedly engaging the plate 10′. The member 26 is rotatably journaled by a ball bearing coupling in the calutron liner wall 9′, as shown. Rotation of the screw thread member 26 is effected by means of a worm gear 27 which is rotatable by means of a mechanical coupling 28 and a position adjust means 29. The means 29 may be a hand crank, motor means, or any other suitable means for effecting rotation of the worm gear 27 by the coupling 28. Thus, rotation of the member 26 by means of members 27, 28 and 29 will position the faces of the plates 23 of the above assembly at the desired distance from the edge of the ion beam 12. Only one positioning means is shown in FIG. 9. It should be understood that a plurality of such means can be used, if desired or required, with the respective worm gears associated therewith being coupled to a common positioning control means. It should also be understood that an identical assembly is positioned on the other side of the ion beam between the ion beam and the other calutron liner wall and the position of such as assembly is positioned in the same manner as set forth above for the assembly 10′, 22, 23, 24 and 25.

The positions of the BIN units in a calutron are shown in FIG. 10. The units are arranged in an arcuate position so that both sides of the ion beam, in the direction of the magnetic field, see essentially a continuous surface of the plates 23 of the BIN units in the region from near the ion source to near the receiver position in the 180° calutron. Each element extends through about 10° of beam trajectory. Where magnetic shims are used, the BIN units are used only between the source region and the 90° beam position, but may be used for the entire 180°, if desired.

The coils 22 of FIG. 9, FIG. 10, and FIG. 11 are wound with 5 turns of No. 16 copper wire, for example. The number of turns is not critical, as any number of turns from 5 to 16 have been used, for example, and have been found to be just as effective as the 5-turn coils. It should be noted that even a greater or lesser number of turns than 5 to 16 can be used, if desired. The resistance of each of the 5-turn coils is about $1 \times 10^{-2}$ ohms and the inductance is about $1 \times 10^{-6}$ henry. The size of each of the carbon plates 23 is about 4 inches by 8 inches with a thickness of ¼ inch, and they are mounted with the centers of the coils about 4 inches apart along the liner side walls. The carbon plates 23 are beveled along adjacent edges so that each one overlaps the next about ¼ inch and yet does not touch the adjoining plate.

When 5-turn coils are used in the BIN units, it has been determined that there is a critical spacing of the segmented walls, above which the units are ineffective in suppressing the fluctuations of the ion beam. When the width of the ion beam, along the magnetic field, is about 4 inches, for example, this critical wall-to-wall spacing of the segmented walls is about 5 inches. It should be noted that spacings less than 5 inches, until the beam strikes the walls, are also quite effective in suppressing ion beam fluctuations. However, the 5-inch spacing is the optimum spacing, and spacings larger than 5 inches with the 4-inch ion beam, as pointed out above, are ineffective in suppressing the ion beam fluctuations. With a 6-inch wall-to-wall spacing of the segmented walls, no beam fluctuation was observed in a 5-inch calcium ion beam over a wide range of tank pressure both above and below the normal rather critical tank pressure heretofore required for satisfactory operation of the conventional calutron. It should be evident that since the above optimum 5-inch spacing is for an ion beam with a 4-inch width or the 6-inch spacing is for a 5-inch beam, there would be different optimum spacings for beams wider or narrower than the 4-inch or 5-inch beams. When the BIN units of the present invention are used as the desired distance from the ion beam in a calutron, the low frequency RF signals are substantially eliminated from the beam and plasma in all pressures investigated, with no significant loss in primary beam intensity.

The best beam quality ever observed in a calcium separation occurred during the use of the BIN system covering the full 180° beam trajectory. FIG. 12 shows a comparison of beam quality-pressure relationships for the standard calutron, the side plate, and the BIN systems. The standard calutron exhibits extreme blow-up at low pressures, best beam quality at intermediate pressure, and high pressure blow-up beginning at about $1.5 \times 10^{-5}$ mm. Hg. The use of side plates reduces the extent of both low and high pressure blow-up and results in improvement in beam quality in any pressure investigated. The BIN system surrounding the ion beam eliminates all abrupt beam blow-up. Invariably beam quality associated with the BIN system is superior to that produced in any other system. The gradual decrease in beam quality, noted as pressure is raised in the latter system, is attributed solely to ion scattering.

In another comparison, the energy of slow ions leaving the beam region along magnetic flux lines has been observed both in a conventional calutron and a calutron provided with a BIN system. In general, a potential of 15 to 30 volts has been observed during operations of a conventional calutron corresponding to the linear region of the slow ion drain curve, region A of FIG. 4, whereas a maximum of 110–150 volts is associated with maximum "take-off" conditions in region B of FIG. 4. The use of a BIN system resulted in slow ion energies of 15–20 volts maximum over the entire pressure range investigated; that is, $7 \times 10^{-7}$ to $5 \times 10^{-4}$ mm. Hg.

A shimmed calutron unit with BIN units up to the 90° position on each side of the beam was operated for the separation of calcium isotopes and substantially improved results were obtained as compared to a standard prior art calcium production run. The following summarizes some of these improved results:

(1) Pressure: A normal calcium run operates at an optimum pressure of $1.5 \times 10^{-5}$ mm. Hg, while deviation of ±.5 causes the operation to be unsatisfactory. However, with the BIN units, the operation improved as the pressure was decreased to the limit of the vacuum system. For example, the use of these BIN units is completely effective to prevent beam blow-up at the maximum beam current and minimum pressure obtainable with $Ca^+$ ions; that is, 250 ma. at a pressure of $7 \times 10^{-7}$ mm. Hg. On the other hand, pressures as high as $1 \times 10^{-4}$ mm. Hg were tested and, although not optimum, operation was not undesirable.

(2) Beam current: Normally, a beam current of 120 ma. for the Ca–40 isotope is considered as a normal optimum operating point for a conventional calutron. With the BIN units installed, a current of 160 ma. was easily achieved under satisfactory operating conditions and no defocusing was observed over a wide range of pressures. This is evidenced by the beam quality curve for the BIN system in FIG. 12. Also, as pointed out above, currents as high as 250 ma. can be achieved without beam blow-up at any pressure.

(3) Focus quality: In a conventional calutron, proper focus for the ion beam is achieved only for a very narrow pressure range of operation. Beam blow-up outside this narrow pressure range not only affects beam quality, but also adversely affects the focal quality of the ion beam. On the other hand, the focus achieved with the use of the BIN system was the best ever observed visually or instrumentally, which can be attributed to lack of beam blow-up in this system over all pressures investigated. For example, with 160 ma. being received in the collection pocket behind a ⅜ inch slot, less than 0.2 ma. were monitored above and below the slot. The beam could be moved ¼ inch at the receiver without an observed decrease in monitored current. Furthermore, as set forth above, the BIN system virtually eliminated low frequency RF oscillations and the amplitude of any detected oscillations was reduced to $\frac{1}{10}$–$\frac{1}{100}$ of those observed in a standard run with a conventional unit. Focus suitable for isotope separation is preserved even at an elevated pressure, $5 \times 10^{-4}$ mm. Hg, where the source will just hold accelerating voltage.

The above-described improved calutron utilizing the BIN system and the improved operating results thereof are for the operation of a single ion beam. However, it should be noted that the present invention is not limited for use with a single ion beam. It has been determined that a two-arc calutron can also be operated very successfully with the utilization of the BIN system. For example, in the separation of the tungsten–184 isotope, the operation of a two-arc calutron resulted in a total quantity received of about three times that of a prior art single-arc operation. Also, there was no obvious interaction between the ion beams as one could be turned off without any apparent effect upon the second beam. On the other hand, a two-arc prior art calutron, for any element, normally results in a product of about 1½ times the quantity achieved with a single-arc conventional unit. In addition, the interaction between the ion beams in the conventional two-arc unit substantially interferes with high-purity ion collection. Thus, heretofore, essentially all isotopic separations were conducted in single-arc units.

Results similar to those for separation of the above tungsten–184 isotope have been obtained in operation of a two-arc unit provided with the BIN system for the separation of uranium isotopes and another for the separation of calcium isotopes. Thus, it can be seen that very stable operation of either a single arc or a two-arc calutron can be achieved with the use of the BIN system of the present invention and the resulting ion beam or beams are well focused with any operating pressure. Also, beam quality has been substantially improved, ion throughput has been substantially increased, and beam blow-up has been essentially eliminated. It should be noted that the BIN system can also be used in calutrons where more than two arcs are employed.

It should be noted that the principles of the above-described invention are not limited for use with calutrons. For example, they may be applied to numerous types of accelerators and many other types of apparatus where beam-plasma interactions are desired to be minimized. One such other apparatus is an ion source for use in injecting an ion beam into a thermonuclear-type device such as disclosed in the U.S. Patents No. 2,969,308, issued January 24, 1961, and No. 3,032,490, issued May 1, 1962. The beam-plasma interactions of the injected molecular ion beam in these patents causes beam spreading of the beam as well as beam spreading of the magnetically trapped ion beams of these patented devices. This beam spreading can be attributed to the same instabilities discussed above for the conventional calutron. Thus, it should be evident that by utilizing suitable BIN systems in the above patented devices, beam blow-up, as well as beam spreading and defocusing, can be materially reduced with a consequent increase in the efficiency of operation of these devices. Also, beam plasma interactions of unwanted types may be prevented in beam plasma tubes by use of these BIN units.

The use of BIN units in calutrons has exhibited a degree of stability of calutron ion beams which was heretofore considered impossible to achieve with such large beams over such a wide range of operating pressures. The limitation of calutrons with BIN units now would be on ion source performance rather than beam stability. Thus, high output ion sources which previously have been discarded because of poor focus, for example, the grid source, can now be utilized for substantially increased throughput in calutrons.

Aside from the use of BIN units as a means of reducing oscillations, as described above, such units may also be used as wall probes for studying the physics of plasmas and the like. For example, when one of the units of FIG. 10 is used as a probe, the output of such a probe could then be connected to a panoramic scope for monitoring the low frequency spectrum of any R.F. signals occurring in the beam and plasma during operation of the calutron. Such a probe may be referred to as a "Boundary Impedance Probe," or "BIP" for brevity. It should be noted that the output of such a BIP can then be used to adjust the position of the BIN units with respect to the ion beam such that the above-described optimum spacing of the BIN units can be continuously maintained for optimum operating results. This may be accomplished by the use of a conventional servo system connected between the BIP and the BIN units in any well known manner.

This invention has been described by way of illustration rather than limitation, and it should be apparent that this invention is equally applicable in fields other than those described.

What is claimed is:

1. Apparatus for substantially reducing low frequency radio frequency signals in an ion beam which is magnetically oriented in a predetermined trajectory within an evacuated region defined by electrically conductive walls, comprising a plurality of units disposed along the path of said ion beam with half of said units forming one group and being positioned on one side of said ion beam between said ion beam and one of said walls and the other half of said units forming a second group and being positioned on the other side of said ion beam between said ion beam and another of said walls, a conductive plate for supporting said one group of said units and being spaced from said one wall in parallel relation thereto, a second conductive plate for supporting said second group of said units and being spaced from said another of said walls in parallel relation thereto, each of said units including a pair of insulators mounted on one of said conductive plates, a conductive plate member mounted on said insulators and spaced from said one conductive plate and the edge of said ion beam in parallel relation thereto, a multi-turn, conductive coil encircling one of said pair of insulators and being connected to ground through said one conductive plate and also being connected to said conductive plate member, said plate member being provided with inclined edges such that said edges overlap in non-contacting relation with the edges of similar plate members of adjacent units such that each plate member extends through about 10° of said trajectory of said ion beam, and means for adjusting the position of said conductive plates and said units affixed thereto with respect to said ion beam such that the faces of said plate members of each of said groups are parallel to and positioned a selected distance from the edge of said ion beam, whereby said radio frequency signals are substantially reduced such that said ion beam is maintained stable and well focused for all operating pressures of said apparatus in the range from $5 \times 10^{-4}$ to $7 \times 10^{-7}$ mm. Hg.

2. The apparatus set forth in claim 1 wherein the number of turns of each of said coils is of a selected number from 5 to 16 turns.

3. The apparatus set forth in claim 1, wherein said apparatus is a calutron and said units are disposed along the path of said ion beam from the 0° position to the 180° position of said ion beam.

4. The apparatus set forth in claim 3, wherein said plate members of each of said groups of units are positioned at a selective distance from said ion beam in the range from near 0 to ½ inch.

5. The apparatus set forth in claim 1, wherein said apparatus is a calutron and said calutron is provided with a plurality of arcs.

References Cited by the Examiner

UNITED STATES PATENTS

| | | | |
|---|---|---|---|
| 2,354,122 | 7/1944 | Hipple | 250—41.9 |
| 2,709,222 | 5/1955 | Lawrence | 250—41.9 |
| 2,712,079 | 6/1955 | Hunter | 250—41.9 |
| 2,719,924 | 10/1955 | Oppenheimer et al. | 250—41.9 |
| 2,724,058 | 11/1955 | Frankel | 250—41.9 |
| 2,725,479 | 11/1955 | Parkins | 250—41.9 |

RALPH G. NILSON, *Primary Examiner.*

W. F. LINDQUIST, *Assistant Examiner.*